United States Patent [19]

Linke et al.

[11] 4,440,483
[45] Apr. 3, 1984

[54] PHOTOGRAPHIC ROLL FILM CAMERA

[75] Inventors: Gerda Linke, Munich; Dieter Engelsmann, Unterhaching; Dieter Maas, Baldham; Alfred Bässler, Munich; Hubert Hackenberg, Holzkirchen, all of Fed. Rep. of Germany

[73] Assignee: Agfa-Gevaert AG, Leverkusen, Fed. Rep. of Germany

[21] Appl. No.: 376,839

[22] Filed: May 10, 1982

[30] Foreign Application Priority Data

May 26, 1981 [DE] Fed. Rep. of Germany ....... 3120864

[51] Int. Cl.³ .......................... G03B 1/56; G03B 17/02
[52] U.S. Cl. ..................................... 354/212; 354/288
[58] Field of Search ................ 354/212, 288, 213–216, 354/202, 275; 242/71.1, 71.4, 71.5

[56] References Cited

U.S. PATENT DOCUMENTS

| 3,387,546 | 6/1968 | Winkler et al. | 354/212 |
| 3,567,147 | 3/1971 | Engelsmann et al. | 354/212 X |
| 3,589,637 | 6/1971 | Wagner | 242/71.1 |
| 3,718,301 | 2/1973 | Morton | 242/71.1 |

FOREIGN PATENT DOCUMENTS

| 929765 | 1/1948 | France | 242/71.1 |
| 46145 | 3/1966 | German Democratic Rep. | 354/212 |

Primary Examiner—John Gonzales
Attorney, Agent, or Firm—Michael J. Striker

[57] ABSTRACT

A photographic roll film camera has a film supply chamber, a spoolless film take-up chamber, a transporting element for transporting the film between these chambers, and a film roll-forming element including a part of the wall of the take-up chamber formed in correspondence to a whole film roll, and a spring-biased guiding lever extending into the take-up chamber and bounding together with the wall a small space for forming a first coil of the film roll so that the initial portion of the film is guided into the small space by the guiding lever and thereafter with increase of the diameter of the film roll during winding of subsequent coils, the guiding lever turns and space for formation of the film roll expands.

20 Claims, 3 Drawing Figures

PHOTOGRAPHIC ROLL FILM CAMERA

BACKGROUND OF THE INVENTION

The present invention relates to a photographic roll film camera with a spoolless film take-up chamber.

Photographic roll film cameras of the above-mentioned general type are known in the art. Known photographic cameras have the above-mentioned spoolless take-up chamber provided with film roll forming means, and also transporting means for transportation of film from a supply chamber or a supply cartridge into the take-up chamber and back into the supply chamber or cartridge. One of such cameras is disclosed, for example, in the German Pat. No. 1,115,571. A perforated roll film is transported by a perforation wheel from a supply cartridge into the take-up chamber and then is transported back into the cartridge, in accordance with the construction disclosed in this patent. A spiral serves as the roll-forming means in the spoolless take-up chamber. In accordance with DE-GMS Pat. No. 1,952,673, the roll-forming means for such a camera is formed as a slide foil band which has, in closed condition of the camera, a cylindrical roll-forming loop. Cylindrical spring loops are also known as roll-forming means in the spoolless film cartridges. The operability of the above-described known roll-forming means depends very much upon their spring or slide characteristics. Thereby their utilization in cameras in which, contrary to the spoolless film cartridges, they must function for years, is not satisfactory. On the other hand, utilization of high-grade materials for these means and their exact shape makes them very expensive.

The German Pat. No. 1,294,108 deals with a roll film camera with an automatic film threading device which has a springy guiding plate which can be supported turnable and closes the film take-up chamber from the rear cover, and also a springy arcuate guiding lever with a concave surface directed against a film spool in the take-up chamber. Thereby, the initial portion of the film after entering between a film gate and the guiding plate is pressed against the engaging means of the film spool and suspended on the latter during rotation of the film spool. The guiding lever has at its end a roller in the region of the film perforations so as not to damage the film and to hold the friction between the film and the guiding lever during increase of the film roll diameter as long as possible. In its initial position, the guiding lever or its roll abuts against the outer surface of the take-up spool. This automatic film threading device better copes with the above-described problems and has a considerably greater service life than the other roll-forming means. However, it is not suitable for spoolless film take-up chambers.

SUMMARY OF THE INVENTION

Accordingly, it is an object of the present invention to provide a photographic roll film camera in which film roll-forming means is designed so that they provide for identical action during a long time, is tolerance-independent and can be produced and mounted in a simple manner.

In keeping with these objects and with others which will become apparent hereinafter, one feature of the present invention resides, briefly states, in a photographic roll film camera having film-supply accommodating means, spoolless film take-up chamber forming means, film transporting means, and film roll-forming means, wherein film roll-forming means includes a part of the take-up chamber wall which corresponds to a whole film roll, and a spring-biased guiding lever extending into the take-up chamber and bounding together with the above mentioned wall a small space in the take-up chamber for forming a first coil of the film roll, so that an initial portion of the film can be deflected into the small space by the guiding lever and thereafter with increase of a diameter of the film roll during winding of subsequent coils the guiding lever turns and thereby this space expands.

When the photographic roll film camera, or more particularly its roll-forming means is designed in accordance with the present invention, it provides for the above-mentioned advantages as compared with the prior art cameras.

In accordance with another advantageous feature of the present invention, the guiding lever is provided at its free end with a rotatable roller, advantageously arranged in the region associated with a perforation region of the film.

Yet another feature of the present invention is that the guiding lever has an axle which defines its axis of turning and is arranged in a depression formed in a further wall of the camera. The depression and thereby the axle of the guiding lever, may be located adjacent to an objective and opposite to a film gate of the camera.

Yet another feature of the present invention is that a stop is provided against which the guiding lever abuts to limit a depth of turning of the guiding lever into the take-up chamber. The edge may be formed between the wall of the take-up chamber and the depression in the further wall.

An adjustable stationary abutment may further be provided and arranged so that a lever arm of the guiding lever is spring-biased to abut against the stationary abutment for fixing a depth of turning of the guiding lever.

A further feature of the present invention is that the guiding lever is concave relative to the wall of the take-up chamber at least in the region of its portion closed to the free end, and has a curvature selected to substantially correspond to the first coil of the film roll in the take-up chamber.

The guiding lever may have a surface facing away from the wall of the take-up chamber and provided with a guiding for guiding the initial portion of the film into the small space in the take-up chamber. This guide may be arranged so as to be associated with a perforation region of the film.

Still a further feature of the present invention resides in a spring-biased guiding plate which closes the take-up chamber from the rear wall of the camera and forms together with the film gate an inlet slot for introducing the initial portion of the film. The guiding plate may have a guiding arm extending into the take-up chamber toward the wall of the latter.

Yet a further feature of the present invention is that a guiding body is provided in the camera extending into the take-up chamber downstream of the film gate and having a first surface facing toward the take-up chamber and having a shape of a circular cylinder with a diameter at least corresponding to a whole film roll, and a surface facing toward the rear wall and forming together with the guiding plate an elongated film passage for deflecting the film into the small space of the take-up chamber. More particularly, the guiding plate may have a guiding arm which forms the elongated film passage with the second surface of the guiding body.

The guiding plate may be supported so that it can turn, and the guiding body may be connected with the guiding plate and turnably supported together with the latter.

Finally, slide rollers, slide foils, or slide ribs may be arranged along the wall of the take-up chamber, preferably in the region associated with perforations of the film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
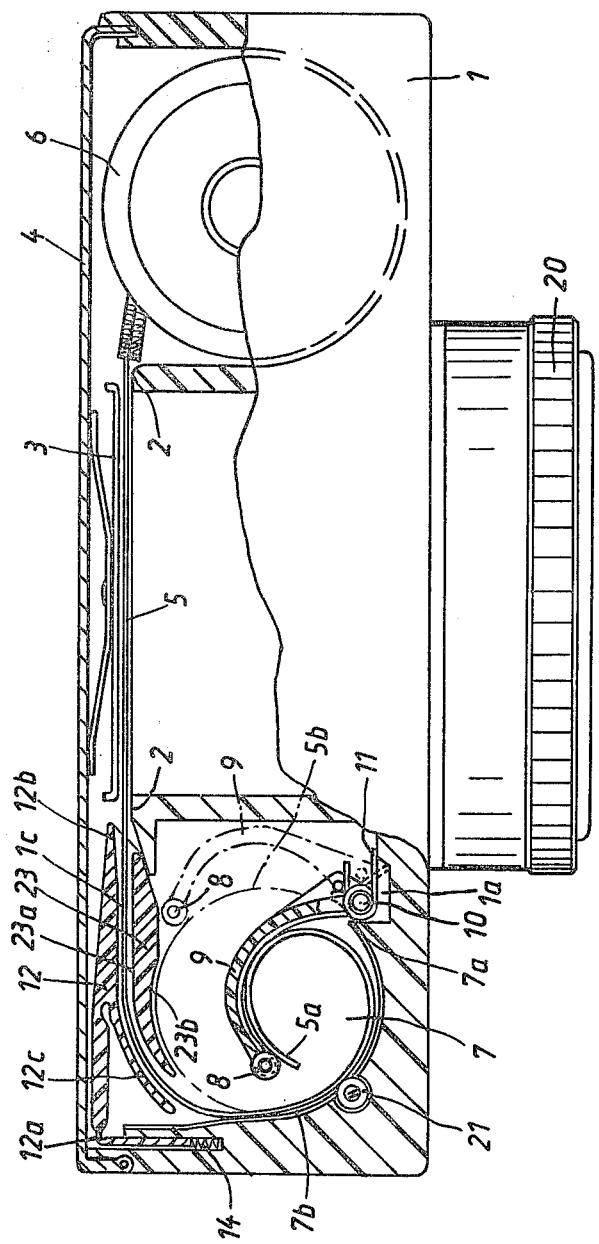
FIG. 1 is a view showing a section of a camera in accordance with the present invention, taken transverse to an axis of a film roll, partially sectioned, wherein the position for film threading is shown in solid lines and the position with completely exposed film roll is shown in dotted lines.

A photographic roll film camera in accordance with the present invention has a housing identified by reference numeral 1, a film path 2, and film pressing plate 3, a camera rear wall 4, wherein a film is identified by reference numeral 5 and has an initial portion 5a.

The camera is designed in a known manner so that the initial portion 5a of the film after insertion of a supply cartridge 6 is automatically transported into a spoolless take-up chamber 7 by driving with the aid of an advance handle so as to form a roll in this chamber.

Driving of the film 5 in both directions can be performed by known means. For example, the film can be transported by a not-shown perforation wheel in both directions, or it can be transported in a film transport direction by a gripper and moved back into the cartridge 6 by driving the cartridge spool. The camera has a guiding lever 9 which is rotatably mounted in the housing 1 on an axle 10 and spring-biased by a spring 11. The spring 11 presses the guiding lever 9 with a roll 8 at its free end into the take-up chamber 7.

Since the take-up chamber 7 is spoolless the axle 10 is arranged in a depression 1a of the housing 1, the depression being located adjacent to the corner or location of the chamber 7 which is neighboring to the objective 20 and remote from the film gate 2. The take-up chamber 7 is formed as a circular cylinder in the region between the rear cover 4 and the depression 1a, wherein the diameter of the circular arc of this cylinder is somewhat greater than the maximum diameter of a whole film roll 5b.

As can be seen from FIG. 1, the guiding lever rests in the empty take-up chamber 7 near its axle 10 on an edge 7a between the wall of the take-up chamber and the depression 1a. Because of its hollow curvature relative to the film roll to be formed and the distance remaining between the wall of the take-up chamber, a small space is formed together with a respective part of the wall of the take-up chamber, the space having the dimension corresponding to a first inner film coil. When the initial portion 5a of the film is transported between the roller 8 and the wall of the take-up chamber to an initial position shown in solid lines in FIG. 1, it forms an inner film coil. During further film transport, subsequent film coils are formed on this first coil, whereby the guiding lever 9 is increasingly turned against the action of its spring 11. When a whole film roll 5b is formed, a position shown in dotted lines in FIG. 1 is attained.

A roller 21 is provided in the wall of the take-up chamber. The roller 8 of the guiding lever as well as the roller 21 of the wall reduce the friction during the subsequent displacement of the film 5 in the take-up chamber 7, and also presses subsequent film coils against film coils located therein under the latter so that a tightly wound film roll 5b is formed.

Figure 2:
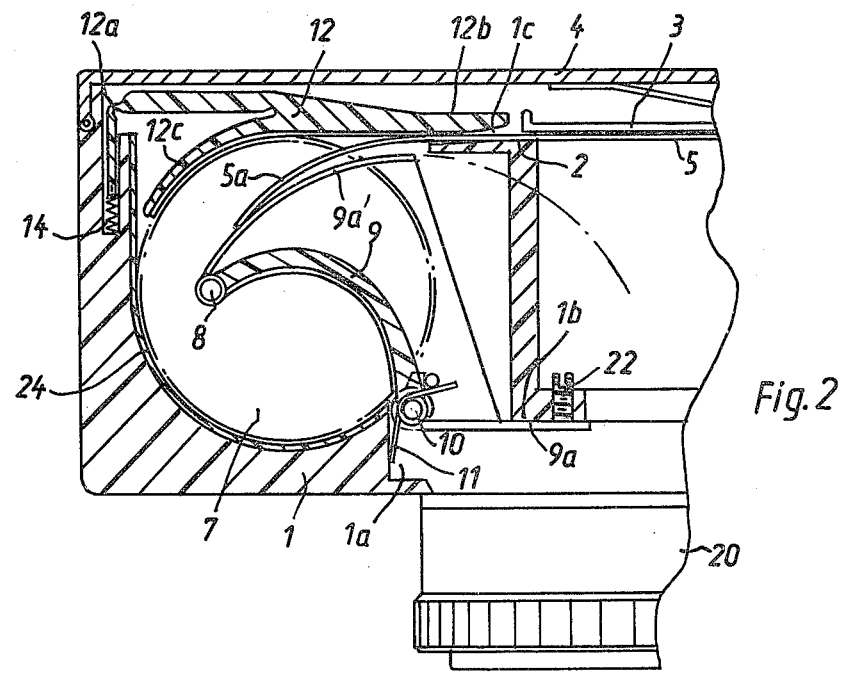
FIG. 2 is a view showing a camera in accordance with another embodiment of the present invention in the position for film threading.
Figure 3:
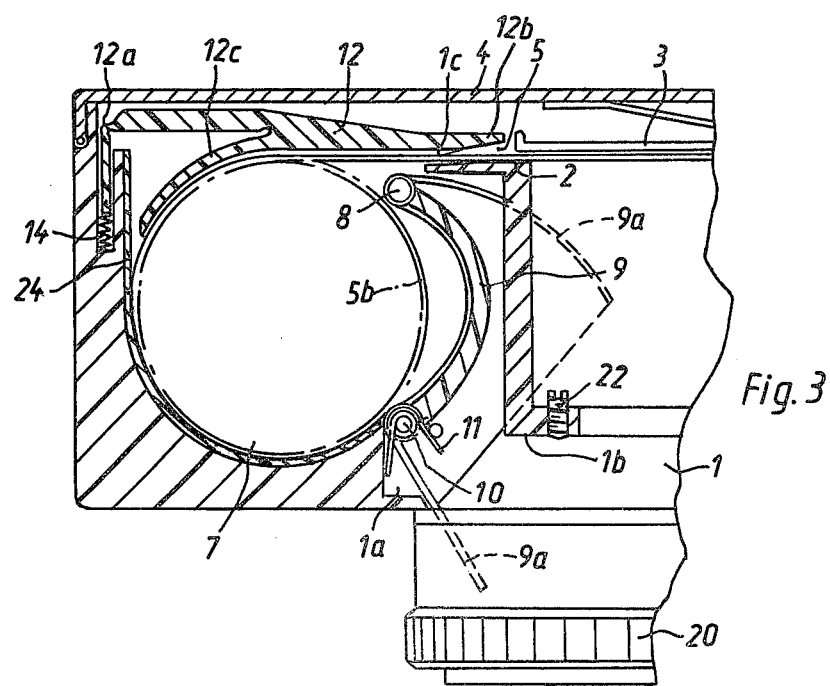
FIG. 3 is a view substantially corresponding to the view of FIG. 2 in the position of the whole film roll.

In a roll film camera shown in FIGS. 2 and 3, the guiding lever 9 is provided with a bent second lever arm 9a. The lever arm 9a abuts against a housing surface 1b so as to guarantee the correct initial position of the guiding lever 9 for forming the above-mentioned small space in which a first film coil is formed. An adjusting screw 22 can extend through the surface 1b and project beyond the latter by a certain distance, whereby the initial position of the guiding lever 9 can be exactly adjusted. This makes possible in the event of great manufacturing tolerances to exactly adjust the initial position of the guiding lever 9 and the roller 8 relative to the wall of the take-up chamber so that in all chambers of one type exactly the same initial conditions for formation of the film roll can be obtained. As a result of this, tolerance-loaded parts such as springs or their forces play no role for formation of the film roll. With the utilization of the inventive roll-forming lever 9, the tolerances of the forces of the spring 11 can be relatively great.

It is, however, important that the initial portion 5a of the film is deflected during first film transport into the small space formed by the guiding lever 9 and the wall of the take-up chamber, between the roller 8 and the wall of the take-up chamber. Generally, all film guiding means between the film gate 2 or pressing plate 3 and the take-up chamber 7 can be utilized. Especially advantageous guiding means are shown in the drawings. The take-up chamber 7 in both embodiments is closed from the camera rear wall by a lever 12. The lever 12 is supported with its end portion 12a in the housing 1 of the camera with interposition of a spring 14. More particularly, it is supported at the end of the take-up chamber 7. Another end portion 12b of the lever 12 is pressed by a spring 14 against the film gate 2. Thereby a small slot 1c is formed between the end portion 12b of the lever 12 and the film gate 2. The initial portion 5a of the film can be inserted through this slot by hand during insertion of a supply cartridge 6. During a first film transport, the film is transported through the slot into the chamber 7.

It is also possible to end the pressing plate 3 so close near the slot that the initial portion of the film during first film transport is automatically introduced into the slot. Furthermore, it is also possible to provide the lever 12 with a cam against which the rear cover 4 presses after closing, so that the slot against the action of the spring 14 with the closed rear cover extends a little, whereby the pressure on the film is reduced and scratching of the film is avoided.

Guiding plates corresponding to the lever 12 are known. In contrast to the known guiding plates, the guiding plate 12 in accordance with the invention has a guiding arm 12c which forms a circular arc which is substantially tangential to the slot 1c and extends between the slot 1c and the circularly cylindrical wall of the take-up chamber. Thereby the initial portion 5a of the film is deflected directly to the wall of the take-up chamber and between this wall and the roller 8 into the small winding space.

When the initial portion 5a of the film has a great curvature, it can happen that it lifts from the surface of the arm 12c and displaces into the space between the roller 8 and the rear side of the guiding lever 9. In order to prevent this phenomenon which could lead to disturbances, the slot 1c is formed in correspondence with the curvature of the guiding arm 12c to the vicinity of the end of the guiding arm 12c. As can further be seen from FIG. 1, a guiding body 23 is arranged downstream of the film gate 2 and has a surface 23a which faces toward the guiding arm 12c, extends parallel to the guiding arm 12c, and forms together with the latter the film guiding slot 1c. The guiding body 23 has a surface 23b which faces toward the take-up chamber 7, is formed as a circularly cylindrical piece, and limits together with the roller 8 in its dotted position the space for a whole film roll 5b.

In the camera shown in FIG. 1, the initial portion 5a of the film is guided through the elongated film slot or passage 1c formed by the guiding arm 12c and the guiding body 23 and its surface 23a so that it proceeds into the small winding space and along the guiding lever 9 to form a first film coil. Further coils are wound tightly thereafter, whereby the guiding lever 9 is more and more turned outwardly. It is advantageous when not one, but two rollers 8 are arranged on the guiding lever 9 and rest on the film 5 in its perforation region. Finally, it is important not to allow the entire film 5 to rub against the wall of the take-up chamber 7, but to provide in its perforation region guides 7b on the wall, corresponding to the shape of the wall of the take-up chamber.

In the camera shown in FIGS. 2 and 3, turning of the strongly curved initial portion 5a of the film into the space behind the guiding lever 9 is prevented by provision guides 9a' on the guiding lever 9, and more particularly at its side facing away from the wall of the take-up chamber. The guide 9a' is provided in the region of the film perforation outside the image field region. The guide 9a' is located close to the film gate 2 in the initial position shown in FIG. 2, and turned into a free camera space in the end position shown in FIG. 3.

Instead of one or several rollers 21 provided in the wall of the take-up chamber 7, a slide foil 24 can be arranged between the rear wall of the camera and the axle 10 of the guiding lever 9 along the wall of the take-up chamber. The slide foil can also be arranged on the cover so that with the closed cover 4 it replaces the guiding plate 12.

In accordance with all embodiments, a portion of the wall of the take-up chamber, which corresponds to a whole film roll 5b, forms together with the spring biased guiding lever 9 a small winding space substantially corresponding to a first small film coil for forming this first film coil therein. The initial portion 5a of the film is guided by the guiding means 12c, 23a or 12c, 9a'. Because of the spring-biased support of the guiding lever 9, the above-mentioned small space gradually expands with the increase of the diameter of the film roll 5b, and subsequent film coils following the curved shape and/or the free end 8 of the guiding lever 9 are tightly laid on the preceeding film coils.

It will be understood that each of the elements described above, or two or more together, may also find a useful application in other types of constructions differing from the types described above.

While the invention has been illustrated and described as embodied in a photographic roll film camera, it is not intended to be limited to the details shown, since various modifications and structural chang es may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic roll film camera, comprising means for accommodating a film supply; means forming a spoolless film take-up chamber; means for transporting a film between said film supply means and said film take-up chamber; means for forming a film roll in said film take-up chamber, said take-up chamber having a wall which corresponds to a whole film roll and thereby forms one part of said film roll forming means, said film roll forming means further having a spring-biased guiding lever extending into said take-up chamber and bounding together with said wall a small space in said take-up chamber for forming a first coil of the film roll so that an initial portion of the film can be guided into said small space by said guiding lever and thereafter with increase of a diameter of the film roll during winding of subsequent coils said guiding lever turns and thereby said space expands, and an adjustable stationary abutment, said guiding lever having a lever arm which is spring-biased to abut against said stationary abutment for fixing a depth of turning of said guiding lever.

2. A photographic roll film camera as defined in claim 1, wherein said guiding lever has a free end and is provided on said free end with a rotatable roller.

3. A photographic roll film camera as defined in claim 2, wherein said rotatable roller of said guiding lever is arranged so as to be associated with a perforation region of the film entering said take-up chamber.

4. A photographic roll film camera as defined in claim 1; and further comprising spring means arranged to bias said lever arm of said guiding lever to abut against said abutment.

5. A photographic roll film camera as defined in claim 1, wherein said guiding lever has a free end and a portion adjacent to said free end, said guiding lever being concave relative to said wall of said take-up chamber at least in the region of said portion and having a curvature selected to substantially correspond to the first coil of the film roll in said take-up chamber.

6. A photographic roll film camera as defined in claim 1, wherein said guiding lever has a surface facing away from said wall of said take-up chamber, said guiding lever having a pivoted end and an end opposite to said pivoted end; and further comprising a guide extending from said opposite end of said guiding lever and arranged for guiding the initial portion of the film into said space.

7. A photographic roll film camera as defined in claim 6, wherein said guide is arranged so as to be associated with a perforation region of the film.

8. A photographic roll film camera as defined in claim 1; and further comprising a film gate, a rear wall, and a spring-biased guiding plate closing said take-up chamber from said rear wall and forming together with said film gate an inlet slot for introducing the initial portion of the film.

9. A photographic roll film camera as defined in claim 8, wherein said guiding plate has a guiding arm extending into said take-up chamber toward said wall of the latter.

10. A photographic roll film camera as defined in claim 7, wherein said guiding plate is supported so that it can turn; and further comprising means for turnably supporting said guiding plate.

11. A photographic roll film camera as defined in claim 7; and further comprising at least one slide roller arranged in said wall of said take-up chamber in its region associated with perforations of the film.

12. A photographic roll film camera as defined in claim 1; and further comprising a slide foil arranged along said wall of said take-up chamber.

13. A photographic roll film camera as defined in claim 1; and further comprising a slide rib arranged along said wall of said take-up chamber in the region associated with perforations of the film.

14. A photographic roll film camera, comprising means for accommodating a film supply; means forming a spoolless film take-up chamber; a film gate; a rear wall; a spring-biased guiding plate closing said take-up chamber from said rear wall and forming together with said film gate an inlet slot for introducing the initial portion of the film; a guiding body extending into said take-up chamber downstream of said film gate and having a first surface facing toward said take-up chamber and having a shape of a circular cylinder with a diameter at least corresponding to a whole film roll, and a second surface facing toward said rear wall and forming together with said guiding plate an elongated film passage for deflecting the film into said small space; means for transporting a film between said film supply means and said film take-up chamber; and means for forming a film roll in said film take-up chamber, said take-up chamber having a wall which corresponds to a whole film roll and thereby forms one part of said film roll forming means, said film roll forming means further having a spring-biased guiding lever extending into said take-up chamber and bounding together with said wall a small space in said take-up chamber for forming a first coil of the film roll so that an initial portion of the film can be guided into said small space by said guiding lever and thereafter with increase of a diameter of the film roll during winding of subsequent coils said guiding lever turns and thereby said space expands.

15. A photographic roll film camera as defined in claim 14; and further comprising a further wall provided with a depression, said guiding lever having an axle defining its axis of turning and arranged in said depression of said further wall.

16. A photographic roll film camera as defined in claim; and further comprising an objective and a film gate, said depression in said further wall and thereby said axle of said guiding lever being located adjacent to said objective and opposite to said film gate.

17. A photographic roll film camera as defined in claim 15; and further comprising an edge forming a stop against which said guiding lever abuts to limit a depth of turning of said guiding lever into said take-up chamber.

18. A photographic roll film camera as defined in claim 17, wherein said edge is formed between said wall of said take-up chamber and said depression of said further wall.

19. A photographic roll film camera as defined in claim 14, wherein said guiding plate has a guiding arm extending into said take-up chamber toward said wall of the latter and forming together with said second surface of said guiding body said elongated film passage.

20. A photographic roll film camera as defined in claim 14, wherein said guiding body is connected with said guiding plate and turnably supported together with the latter.

* * * * *